(12) United States Patent
Gao et al.

(10) Patent No.: US 12,711,047 B2
(45) Date of Patent: Aug. 18, 2026

(54) CONTROLLING UNCERTAIN OUTPUT BY LARGE LANGUAGE MODELS

(71) Applicant: Intuit Inc., Mountain View, CA (US)

(72) Inventors: Xiang Gao, Mountain View, CA (US); Jiaxin Zhang, Mountain View, CA (US); Lalla Mouatadid, Ontario (CA); Kamalika Das, Saratoga, CA (US)

(73) Assignee: Intuit Inc., Mountain View, CA (US)

( * ) Notice: Subject to any disclaimer, the term of this patent is extended or adjusted under 35 U.S.C. 154(b) by 204 days.

(21) Appl. No.: 18/220,814

(22) Filed: Jul. 11, 2023

(65) Prior Publication Data

US 2025/0021468 A1 Jan. 16, 2025

(51) Int. Cl.
*G06F 9/44* (2018.01)
*G06F 11/3668* (2025.01)
*G06F 40/20* (2020.01)

(52) U.S. Cl.
CPC ...... *G06F 11/3684* (2013.01); *G06F 11/3688* (2013.01); *G06F 40/20* (2020.01)

(58) Field of Classification Search
CPC ... G06F 11/3684; G06F 11/3688; G06F 40/20
See application file for complete search history.

(56) References Cited

U.S. PATENT DOCUMENTS 11,803,556 B1 * 10/2023 Samdani ........... G06F 16/24578
11,900,921 B1 * 2/2024 Gupta ..................... G10L 15/22
2017/0091170 A1 * 3/2017 Cardillo .................. G06F 40/56
2018/0039690 A1 * 2/2018 Zhai ...................... G06F 40/289
2021/0012212 A1 * 1/2021 Sikka ....................... G06N 5/04
2021/0082411 A1 * 3/2021 Yasa ....................... G10L 15/26
2021/0390266 A1 * 12/2021 Zhang ..................... G06F 40/51
2022/0374345 A1 * 11/2022 Brown .................... G06F 40/30
2023/0274086 A1 * 8/2023 Tunstall-Pedoe ....... G06F 40/20 704/9
2024/0311405 A1 * 9/2024 Kim .................... G06F 16/3329

OTHER PUBLICATIONS

Kohn, L., et al., "Semantic Uncertainty: Linguistic Invariances for Uncertainty Estimation in Natural Language Generation", Apr. 15, 2023, 19 pages.

Lin, S, et al., "Teaching Models to Express their Uncertainty in Words", Jun. 13, 2022, 19 pages.

* cited by examiner

*Primary Examiner* — Bradley A Teets
*Assistant Examiner* — Lenin Paulino
(74) *Attorney, Agent, or Firm* — Lathrop GPM LLP

(57) ABSTRACT

A method including receiving a user input from a user device. The method also includes generating test inputs including the user input and modified inputs. The user input is processed with a rephrasing model to form the modified inputs. The method also includes executing a test model to generate test outputs, including an original test output and modified test outputs, from processing the test inputs. The method also includes generating similarity scores by performing similarity comparisons among the test outputs. The method also includes determining a model confidence from the similarity scores. The method also includes routing the user input responsive to the model confidence satisfying or failing to satisfy a confidence threshold.

10 Claims, 5 Drawing Sheets

CONTROLLING UNCERTAIN OUTPUT BY LARGE LANGUAGE MODELS

BACKGROUND

A large language model is a type of machine learning model that can perform natural language processing tasks, such as generating and classifying text, answering questions, and translating text. Large language models are based on deep learning machine learning models which are trained on large amounts of natural language text data. During training, large language models learn patterns and relationships within a language. The large language model then uses the patterns and relationships to predict the likelihood of a next word based on the words that came before the current word being predicted. It is possible for a large language model to generate entire paragraphs or compositions of text in this manner. An example of a large language model is CHATGPT®, by OpenAI, L.P.

The output of large language models may not make sense to a human in some cases. Additionally, small changes in text or meaning may result in different answers being output by the large language model. Furthermore, large language models do not always generate exactly the same output when an identical input is provided to the large language model multiple times. Thus, large language models may be associated with an uncertainty, or at least may produce semantically inconsistent outputs.

As used herein, the term "large language model" is an industry standard term. Thus, the term "large," as used herein, is understood and ascertainable by a computer scientist.

SUMMARY

The one or more embodiments provide for a method. The method includes receiving a user input from a user device. The method also includes generating test inputs including the user input and modified inputs. The user input is processed with a rephrasing model to form the modified inputs. The method also includes executing a test model to generate test outputs, including an original test output and modified test outputs, from processing the test inputs. The method also includes generating similarity scores by performing similarity comparisons among the test outputs. The method also includes determining a model confidence from the similarity scores. The method also includes routing the user input responsive to the model confidence satisfying or failing to satisfy a confidence threshold.

The one or more embodiments also provide for a system. The system includes a processor, a memory, and an application stored on the memory. The application, when executed by the processor, receives a user input. The application, when executed by the processor, also generates test inputs including the user input and modified inputs. The user input is processed with a rephrasing model to form the modified inputs. The application, when executed by the processor, also executes a test model to generate test outputs, including an original test output and modified test outputs, from processing the test inputs. The application, when executed by the processor, also generates similarity scores by performing similarity comparisons among the test outputs. The application, when executed by the processor, also determines a model confidence from the similarity scores. The application, when executed by the processor, also routes the user input responsive to the model confidence satisfying or failing to satisfy a confidence threshold.

The one or more embodiments also provide for a non-transitory computer readable storage medium storing computer readable program code. The computer readable program code, when executed by a processor, performs a computer-implemented algorithm. The computer-implemented algorithm includes receiving a user input from a user device. The computer-implemented algorithm also includes generating test inputs including the user input and modified inputs. The user input is processed with a rephrasing model to form the modified inputs. The computer-implemented algorithm also includes executing a test model to generate test outputs, including an original test output and modified test outputs, from processing the test inputs. The computer-implemented algorithm also includes generating similarity scores by performing similarity comparisons among the test outputs. The computer-implemented algorithm also includes determining a model confidence from the similarity scores. The computer-implemented algorithm also includes routing the user input responsive to the model confidence satisfying or failing to satisfy a confidence threshold.

Other aspects of the one or more embodiments will be apparent from the following description and the appended claims.

BRIEF DESCRIPTION OF DRAWINGS

Like elements in the various figures are denoted by like reference numerals for consistency.

DETAILED DESCRIPTION

In general, the one or more embodiments are directed to controlling uncertain output by large language models. As indicated above, large language machine learning models may not generate answers that are useful to a human asking a question. For example, the model may not properly process the semantic intent of a human asking a question. As a specific example, a human may ask, "are the bills coming like it was raining cats and dogs?" The large language model may not understand the semantic intent of the human query and respond with outputs such as, "I do not understand" or "cats and dogs do not fall like rain." Either answer may be deemed undesirable in some cases.

Additionally, small perturbations in language may result in the large language model producing different, possibly inconsistent, answers. Indeed, the same input provided multiple times to the large language model may produce different answers which may, or may not, be consistent. Thus, a large language model may be subject to multiple forms of uncertainty, leading to an undesirable performance of the large language model.

The uncertainty may, in turn, affect other systems. For example, a large language model may generate answers to inputs provided to a chatbot. Thus, from the perspective of a user, the chatbot automatically generates answers to human-supplied queries. If the chatbot does not provide consistent answers that make sense to a human, the performance of the chatbot may be deemed undesirable in some cases.

The one or more embodiments address these and other technical difficulties that arise from uncertainty in large language models, as well as uncertainty in other natural language processing machine learning models. In particular, the one or more embodiments measure a model confidence with a user-supplied input to the large language model. The model confidence is compared to a confidence threshold. Based on whether the model confidence satisfies the confidence threshold, a user query supplied to the model may be routed differently. As a result, the user experience may be improved by returning more consistent and more relevant answers to a user.

Figure 2:
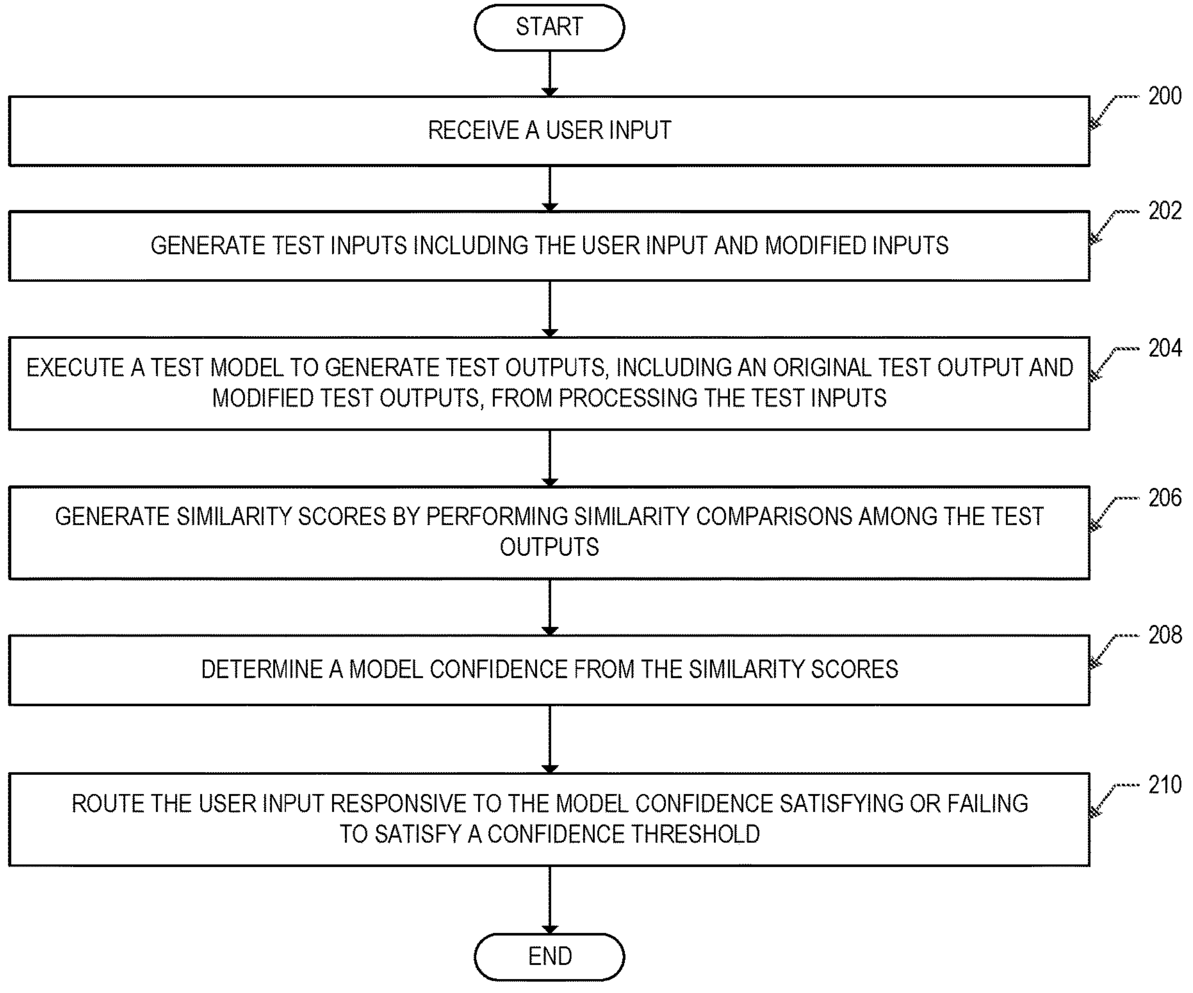
FIG. 2 shows a method of controlling uncertain output by large language models, in accordance with one or more embodiments.

As more fully explained with respect to FIG. 2, the originally supplied user input is varied by the model under test or by some other model. The variations of the original user input are supplied as input to the model under test. The resulting outputs of the machine learning model are compared to each other. The comparison generates similarity scores which represent a measurement of the semantic similarity between pairs of outputs. The similarity scores are used to generate the model confidence score. The model confidence score is compared to the confidence threshold, which is set by a computer scientist or some automated process.

If the model confidence satisfies the confidence threshold, then the user input may be routed to the machine learning model in question. However, if the model confidence fails to satisfy the confidence threshold, then the user input may be routed to some other destination in a computing system, such as but not limited to some different machine learning model or to a human facilitator who can review and answer the user input.

Figure 3:
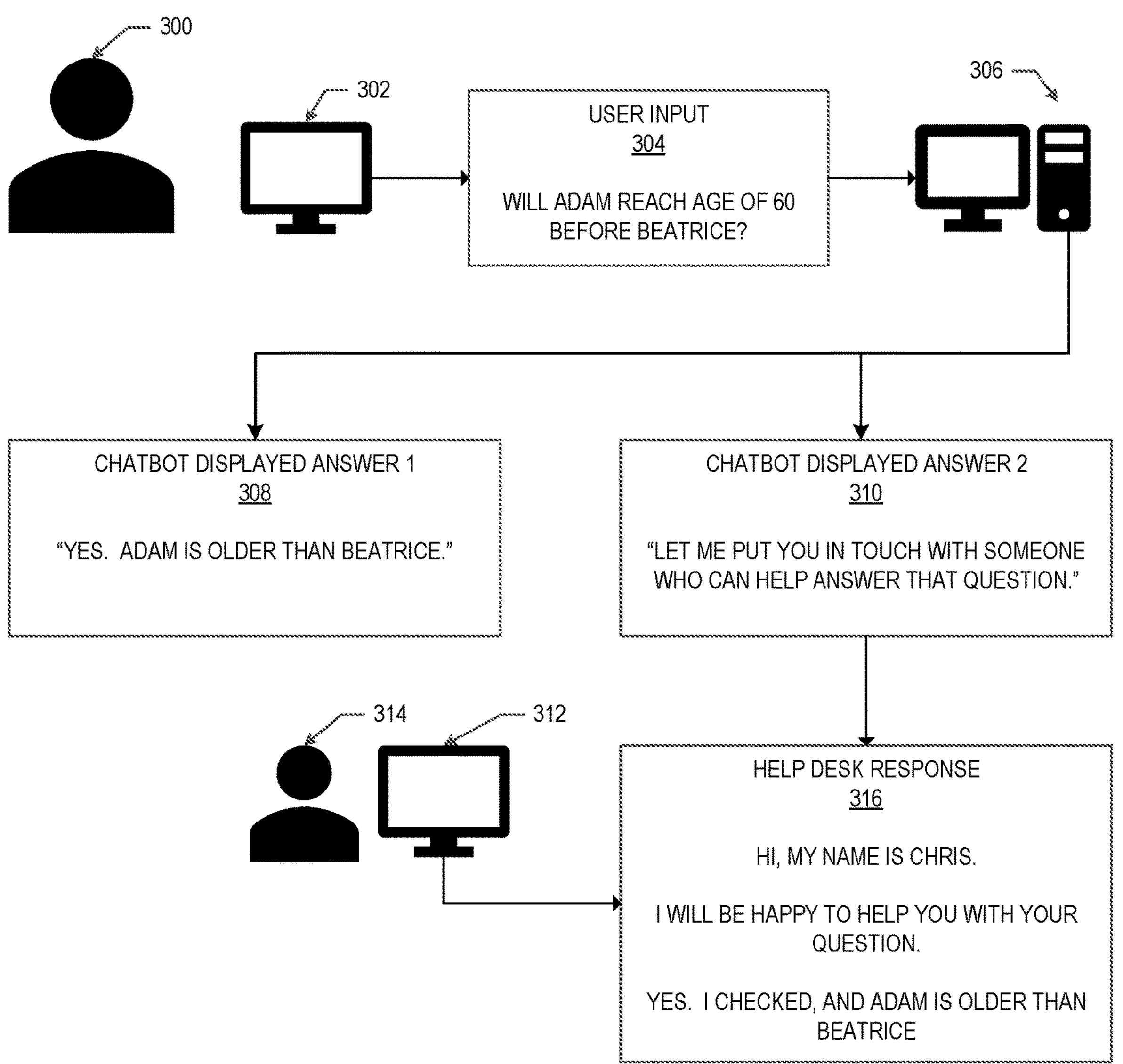
FIG. 3 and FIG. 4 show an example use of controlling uncertain output by large language models, in accordance with one or more embodiments.
Figure 4:
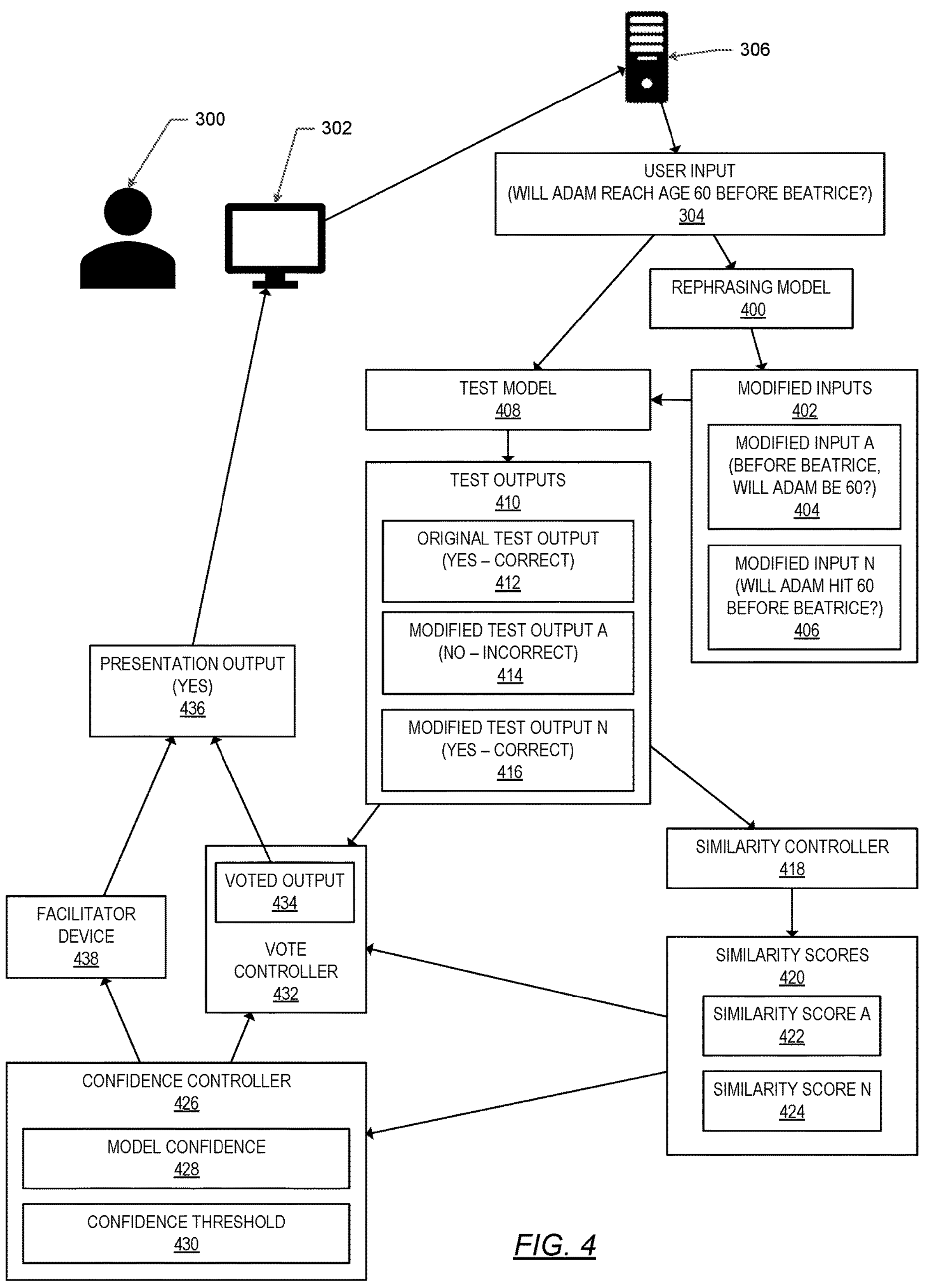

Thus, as described further with respect to the example of FIG. 3 and FIG. 4, the one or more embodiments may be used to evaluate whether a machine learning model that drives a chatbot "understands" a user input (i.e., the model confidence meets the confidence threshold). If so, then the user input may be routed to the machine learning model, which in turn automatically generates a response to the user query. If not, then the user input may be routed to a human facilitator, or may be routed to some other machine learning model which may be a different model, trained differently on a different corpus, or some combination thereof. As a result, the user experience may be improved by returning more consistent and more relevant answers to a user.

Note that the one or more embodiments are not limited to monitoring chatbots. The one or more embodiments also may be applicable to other types of language models. Thus, the one or more embodiments may be used to route the user input for different types of language models that generate a continuation of a given text. Similarly, the one or more embodiments may be applied to applications other than questions and answers which may be generated by language models. The one or more embodiments also may be applied to routing the user input for language models programmed to perform text summarization, story generation, and other language model applications.

Figure 1:
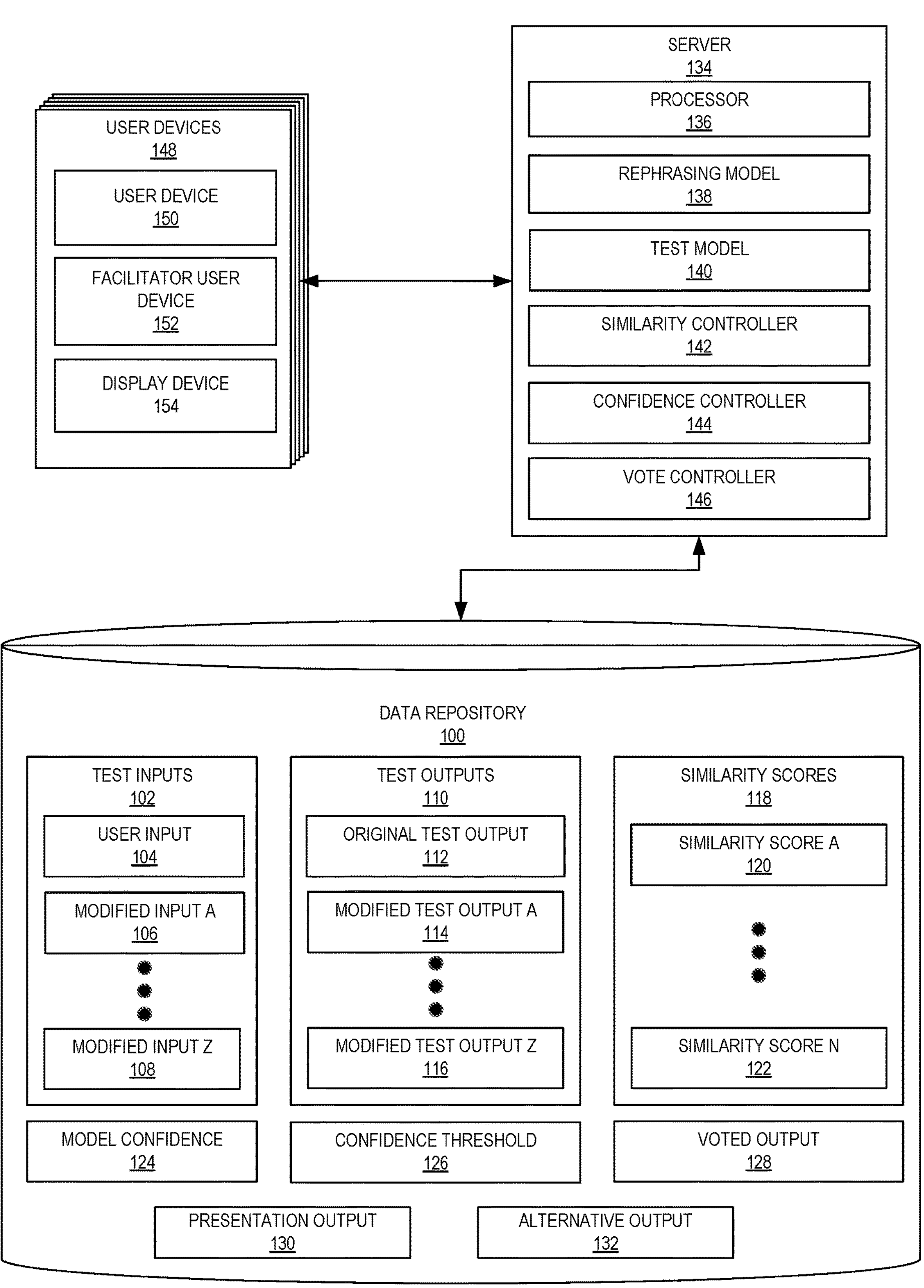
FIG. 1 shows a computing system, in accordance with one or more embodiments.

Attention is now turned to the figures. FIG. 1 shows a computing system, in accordance with one or more embodiments. The system shown in FIG. 1 includes a data repository (100). The data repository (100) is a type of storage unit and/or device (e.g., a file system, database, data structure, or any other storage mechanism) for storing data. The data repository (100) may include multiple different, potentially heterogeneous, storage units and/or devices.

The data repository (100) stores a number of test inputs (102). The test inputs (102) are inputs that are provided to the machine learning model under test. The test inputs (102) may take the form of natural language text. Generation of most of the test inputs (102) is described with respect to FIG. 2.

The test inputs (102) may include a user input (104). The user input (104) is the original input received from a user. The user input (104) is also natural language text.

The user input (104) may be user input received from a user device operated by a human. However, the user input (104) may be defined by an automated computer process, such as by another language processing machine learning model. In either case, the user input (104) is received at a server executing a machine learning model, as described below.

The test inputs (102) also include modified inputs, such as modified input A (106) and modified input Z (108). The ellipsis between the modified input A (106) and the modified input Z (108) indicate that many more modified inputs may be present other than the modified input A (106) and the modified input Z (108) shown.

A modified input (e.g., the modified input A (106) or the modified input Z (108)) is a modification of the user input (104), and thus is natural language text that is a modified version of the original natural language text received as the user input (104). As described further with respect to FIG. 2, the user input (104) originally received is modified into different statements which are semantically similar to the user input (104).

The term "similar to" means each of the modified inputs are within a quantifiable distance of each other when the semantic meanings of the modified inputs are quantified. Quantification of the modified inputs may be performed by another language processing machine learning model which assigns a score to the semantic meanings of the modified inputs. Thus, for example, the modified input A (106) is similar to the modified input Z (108) when the difference between the semantic scores for the modified input A (106) and the modified input Z (108) is below a threshold value.

Alternatively, the vector embeddings that represent the two texts in question may be fed to a machine learning model, which then may determine the cosine similarity between the vector embeddings.

A vector is a N×M matrix (often 1×M) which defines data as a number of features, for which a value is assigned to each feature. Thus, for example, in language processing, a word, letter, phrase, or combination thereof may be represented as a feature, and information about that feature (e.g., the presence or absence of the feature) is associated with the feature in the form of a number which represents the nature of the feature. For example, if a feature defined for a vector is "whether the letter 'Y' is present", then if the value is "1," then the letter "Y" is present. Otherwise, if the value is "0," then the letter "Y" is not present.

The data repository (100) also stores one or more test outputs (110). The test outputs (110) are the results of the machine learning model under test executing on one of the test inputs (102). Thus, for example, the original test output (112) is the output of the machine learning model when the user input (104) is provided to the machine learning model under test. Similarly, the modified test output A (114) is the output of the machine learning model when the modified input A (106) is provided to the machine learning model under test. Likewise, the modified test output Z (116) is the output of the machine learning model when the modified input Z (108) is provided to the machine learning model under test.

The ellipsis between the modified test output A (114) and the modified test output Z (116) indicate that many more modified test outputs may be present. Thus, each instance of the test inputs (102) will correspond to one of the test outputs (110).

The data repository (100) also stores a number of similarity scores (118), including similarity score A (120) and similarity score N (122). The ellipsis between the similarity score A (120) and the similarity score N (122) indicate that many more of the similarity scores (118) may be present.

A similarity score is a quantified measurement of the semantic similarity between two of the test outputs (110). In an embodiment, each of the test outputs (110) is compared to each of the other test output in the test outputs (110). However, in some embodiments only selected ones of the test outputs (110) are compared to each other. Further detail regarding generation of the similarity scores is described with respect to FIG. 2.

The data repository (100) also stores a model confidence (124). The model confidence (124) is a number that represents a quantified measurement of how stable the outputs of the machine learning model will be when provided with the user input (104). As described with respect to FIG. 2, the model confidence (124) may be an average of the similarity scores (118).

The data repository (100) also may store a confidence threshold (126). The confidence threshold (126) is a number or a set of numbers comparable to the model confidence (124). Use of the confidence threshold (126) is described with respect to FIG. 2.

The data repository (100) also stores a voted output (128). The voted output (128) is one of the test outputs (110). The voted output (128) is referred to as a "voted" output because a voting process is used to determine which of the test outputs (110) will be used as the output of the machine learning model. The process of determining the voted output (128) is described with respect to FIG. 2.

The data repository (100) also stores a presentation output (130). The presentation output (130) is a final result that is transmitted to a user device (defined below). As described further below with respect to FIG. 2, satisfaction of the model confidence (124) may route the user input (104) to either a machine learning model or to some other destination (such as a human facilitator). The result of the machine learning model (or the answer provided by the human facilitator) is the presentation output (130) that is presented to a user device of a user. Thus, it is possible that, in some embodiments, the presentation output (130) is the voted output (128).

The data repository (100) also stores an alternative output (132). The alternative output (132) is the output of some other machine learning model (or some other system) that is determined based on the user input (104). The alternative output (132) may be the presentation output (130) in some cases.

The system shown in FIG. 1 also may include a server (134). The server (134) is one or more computing systems, possibly in a distributed computing environment. An example of the server (134) may be the computing system shown in FIG. 5A.

The server (134) may host and/or execute one or more processes, software, applications, etc. The server (134) may include a processor (136). The processor (136) is hardware or virtual machines configured to execute the controllers and machine learning models described herein. The processor (136) may include multiple processors units, possibly in a distributed computing environment. An example of the processor (136) may be the computer processor(s) (502) described with respect to FIG. 5B.

The server (134) also may include a rephrasing model (138). The rephrasing model (138) is a natural language processing machine learning model, such as a large language model. For example, the rephrasing model (138) may be, for example, CHATGPT® owned by OpenAI, L.P. However, the rephrasing model (138) may be other language models.

The server (134) also includes a test model (140). The test model (140) is the machine learning model that is under test. In some embodiments the test model (140) also may be the rephrasing model (138). However, in other embodiments, the test model (140) may be a machine learning model that is different than the rephrasing model (138).

The server (134) also includes a similarity controller (142). The similarity controller (142) is software and/or application specific hardware programmed, when executed by the server (134), to generate the similarity scores (118). The similarity controller (142) may be a machine learning model in some cases, such as for example a machine learning model that performs a cosine similarity comparison between the test outputs (110).

The server (134) also may include a confidence controller (144). The confidence controller (144) is software or application specific hardware programmed, when executed by the processor (136), to generate the model confidence (124) as described with respect to FIG. 2. The confidence controller (144) also may be programmed to compare the model confidence (124) to the confidence threshold (126), and to route the user input (104) accordingly.

The server (134) also may include one or more additional machine learning models. The additional machine learning models may be language processing machine learning models, other than the rephrasing model (138) or the test model (140). For example, the additional machine learning models may be one or more natural language models that are trained on domain-specific data. For example, if the model confidence (124) fails to satisfy the confidence threshold (126) for the user input (104), then the domain of the user input (104) may be determined and another attempt made by the additional machine learning model(s) to automatically determine an appropriate response to the user input (104).

Note that the procedures of described with respect to FIG. 2, below, may be repeated to measure the confidence of the additional machine learning models. Thus, routing the user input (104) may include multiple steps (e.g., routing the user input (104) first to the additional machine learning models, then to a human facilitator if the model confidence (124) for the additional machine learning model also fails the confidence threshold (126).

The server (134) also may include a vote controller (146). The vote controller (146) is software or application specific hardware programmed, when executed by the processor (136) to generate the voted output (128). The voted output (128) is generated in a manner described with respect to FIG. 2.

The system shown in FIG. 1 optionally may include one or more user devices (148). The user devices (158) are computing systems (desktops, laptops, mobile phones, tablets, etc.) that are used by human users or by automated processes (e.g., other software that may generate the user input (104)). In some embodiments, the user devices (158) are not part of the system shown in FIG. 1, but rather are remote devices that are not under the control of the entity that manages the server (134).

The user devices (158) may include a user device (150). The user device (160) is an instance of the user devices (158) that generates the user input (104) as described herein.

The user devices (158) may include a facilitator user device (152). The facilitator user device (152) is an instance of the user devices (150) that a human person may use to answer the user input (104). An example of the facilitator user device (152) is shown in FIG. 3.

The user devices (148) may include a display device (154). The display device (154) is a monitor, television, touchscreen, speaker, etc. configured to generate visual, audio, or haptic output.

While FIG. 1 shows a configuration of components, other configurations may be used without departing from the scope of the one or more embodiments. For example, various components may be combined to create a single component. As another example, the functionality performed by a single component may be performed by two or more components.

FIG. 2 shows a method of controlling uncertain output by large language models, in accordance with one or more embodiments. The method of FIG. 2 may be performed using the system of FIG. 1.

Step 200 includes receiving a user input for input to a machine learning model. The user input may be received from a user device which received human input that generated the user input. The user input may be received from an automated process (e.g. some other machine learning model, or perhaps the machine learning model under test in some cases—if prompted to generate the user input).

Step 202 includes generating test inputs. The test inputs are based on the user input. The test inputs may include the user input. The remaining test inputs are modified inputs that each are semantically similar to the user input.

The modified inputs are generated by inputting the user input into a rephrasing model. The user inputs may be input into the rephrasing model under test in some cases, with a command to the rephrasing model to vary the original input. The modified inputs also may be generated by some other machine learning model, including different kinds of generative pre-training transformer (GPT) models or other language models. The modified inputs also may be provided by a human computer scientist. The modified inputs also may be generated by duplicating a modified input that is different than the original user input. The modified inputs may include, in some cases, the original user input or duplicates thereof.

Step 204 includes executing a test model to generate test outputs, including an original test output and modified test outputs, from processing the test inputs. In other words, each of the test inputs (including the user input and the modified inputs) are provided as input to the rephrasing model. The rephrasing model generates an output for each of the test inputs. Operation of the machine learning model may be that of a large language model, such as but not limited to CHATGPT®, owed by OpenAI, L.P.

Step 206 includes generating similarity scores by performing similarity comparisons among the test outputs. The similarity comparisons may be performed by a number of different techniques. In one embodiment, the similarity scores may be generated providing the test outputs to a cosine similarity machine learning model. The outputs of the cosine similarity machine learning model are the similarity scores.

In another embodiment, the test outputs may be provided to a binary classifier machine learning model. In this example, the outputs of the binary classifier machine learning model are either 0 (not the same semantic meaning between two test outputs) or 1 (the same semantic meaning between two test outputs). Thus, in this example, the similarity scores are a series of 1's or 0's. If all of the similarity scores are 1, then all of the test outputs are semantically similar to each other. If all of the similarity scores are 0, then none of the test outputs are semantically similar to each other. In the more likely event that some of the similarity scores are 1 and others are 0, then some of the test outputs are semantically similar to each other, and some of the test outputs are not semantically similar to each other.

The similarity scores may be generated by using still other methods. For example, the similarity scores may be generated using machine learning models such as a bilingual evaluation understudy (BLEU) machine learning model or a recall-oriented understudy for gisting evaluation (ROUGE) machine learning model. Thus, the one or more embodiments are not limited to the examples given above with respect to generating the similarity scores.

Step 208 includes determining a model confidence from the similarity scores. In one embodiment, the model confidence may be determined by averaging the similarity scores (i.e., summing the similarity scores together and dividing by the number of similarity scores). However, other methods of generating the model confidence may be used. For example, the similarity scores and the corresponding pairs of test outputs may be provided to another machine learning model, which then determines a probability that the machine learning model under test is consistently producing semantically similar answers. Alternatively, the other machine learning model could be a classification machine learning model that classifies the machine learning model under test as either a confident model or a non-confident model. Other techniques for generating the model confidence are possible.

Step 210 includes routing the user input responsive to the model confidence satisfying or failing to satisfy a confidence threshold. In an embodiment, the confidence threshold is satisfied when the model confidence meets or exceeds the confidence threshold value. The confidence threshold is not satisfied when the model confidence is less than the confidence threshold value.

However, satisfaction of the confidence threshold may be defined differently in different embodiments. For example, the confidence threshold may be satisfied only when the model confidence exceeds the confidence threshold value. In another example, the confidence threshold value may be defined in a manner that the confidence threshold is satisfied when the model confidence is less than the confidence threshold value. Thus, the one or more embodiments contemplate different definitions of "satisfying" the confidence threshold; however, satisfaction of the confidence threshold is pre-determined and is quantitatively defined.

When the model confidence satisfies the confidence threshold, the machine learning model under test may be said to "understand" the semantic meaning of the original user input. Additionally, in this case, the machine learning model under test may be determined to be "confident" enough to return a current output of the machine learning model as the presentation response.

Thus, when the model confidence satisfies the confidence threshold, the user input is routed to the machine learning model under test. The machine learning model then may return the original output of the machine learning model to the user device. More particularly, the method then further includes executing the machine learning model on the user input to generate a presentation output, and then transmitting the resulting presentation output to a user device from which the user input was received.

However, when the model confidence fails to satisfy the confidence threshold, the user input is routed to some destination other than the machine learning model under test. For example, the user prompt may be routed to a facilitator user device. In this case, the user input is displayed on the facilitator user device. A human facilitator may then answer the user prompt, in which case the facilitator's answer is returned to the user device that supplied the original user input.

In a variation, routing to another destination may include routing the user input to an additional machine learning model other than the initial machine learning model under test. For example, a knowledge domain of the user input may be determined, and the user input is then routed to a different language processing machine learning model that is trained based on that particular knowledge domain.

In this case, the alternative machine learning model may be executed on the user input to generate an alternative output. The alternative user input is then presented to a user device from which the user input was received.

The examples provided above show how the confidence estimation controller may be configured to route a user input. Actual routing may be performed using an application programming interface or some other software or hardware tool.

The method of FIG. 2 may also be varied by generating a voted output. prior to generating the presentation output. An automated voting process may be performed on the test outputs. The test output that receives the highest voting score is the voted output, which may be selected as the presentation output. Thus, the voted output corresponds to a test output, from the set of test outputs, that corresponds to a similarity score, from the set of similarity scores, that is greater than each of the remaining similarity scores.

As an example, if five of the test outputs are "no" and seven of the test outputs are "yes," then the voted output is "yes" because the "yes" vote has more total test outputs. Accordingly, the "yes" answer is provided to the user as the presentation output.

Alternatively, the most common output may be the output of the highest average similarity with other outputs. Thus, voting may be a process that is different than a simple majority vote. Other voting schemes are contemplated.

While the various steps in the flowchart of FIG. 2 are presented and described sequentially, at least some of the steps may be executed in different orders, may be combined or omitted, and at least some of the steps may be executed in parallel. Furthermore, the steps may be performed actively or passively.

FIG. 3 and FIG. 4 show an in-use example of the system of FIG. 1 and the method of FIG. 2. Specifically, FIG. 3 and FIG. 4 show an example of controlling uncertain output by large language models, in accordance with one or more embodiments. The following example is for explanatory purposes only and not intended to limit the scope of the one or more embodiments.

FIG. 3, in particular, shows how a human user may interact with a chatbot, according to the one or more embodiments. FIG. 4 shows exemplary details of how the model confidence is generated and used in the context of the example of FIG. 3. In FIG. 3 and FIG. 4, common reference numerals refer to common objects having common descriptions.

Turning to FIG. 3, a user (300) is using a user device (302). The user wishes to know whether Adam will reach the age of 60 before Beatrice. Thus, the user inputs a user input (304) into the user device (302).

The user input (304) is transmitted to a server (306). The server (306) is executing a chatbot which is programmed to receive the user input (304) and to display answers to the user regarding the user input (304). In particular, a large language model is executable by the server (306). The large language model is programmed to take, as input, the user input (304) and to generate, as output, a natural language answer which is then displayed on the user device (302) via the chatbot.

However, before generating or displaying the output of the large language model, the model confidence for the user input (304) is generated according to the method described with respect to FIG. 2. The model confidence is compared to a confidence threshold value. What the user (300) ultimately sees depends on whether the model confidence satisfies the confidence threshold value.

For answer 1 (308), the model confidence satisfied a confidence threshold value. As a result, the user input (304) is routed to the large language model that was tested. The output of the machine learning model is, "Yes. Adam is older than Beatrice." The machine learning model output (i.e., the answer 1 (308)) is displayed on the user device (302) via the chatbot as the presentation output.

However, for answer 2 (310), the model confidence did not satisfy the confidence threshold value. In this example, because the model confidence did not satisfy the confidence threshold value, the chatbot routes the user input (304) to a facilitator user device (312) operated by a human facilitator (314). The chatbot displays the user input (304) on the facilitator user device (312) to the human facilitator (314). The chatbot also displays the answer 2 (310) on the user device (302) of the user (300), which states, "Let me put you in touch with someone who can help answer that question."

The human facilitator (314) then considers the user input (304) and types directly into the chatbot to generate a help desk response (316). The help desk response (316) is displayed on the user device (302) to the user (300) via the chatbot. Alternatively, a new live chat session may be instituted for the user (300).

In either case, the help desk response (316) states, "Hi, my name is Chris. I will be happy to help you with your question. Yes. I checked, and Adam is older than Beatrice." In this manner, the user again receive an answer that is relevant and useful to the user, and is more likely to be correct.

Thus, by using a model confidence generated for the machine learning model that drives the chatbot, the user (300) is more likely to receive an answer that is both understandable and helpful to the user (300). Accordingly, the user experience of the user (300) may be improved.

The details regarding generating the model confidence mentioned in FIG. 3 is now described with respect to FIG. 4. Again, the user (300) provides, via the user device (302), the user input (304) to a chatbot executed by the server (306). The user input (304) is, again, "will Adam reach age 60 before Beatrice?"

The server (306) executes a rephrasing model (400), which may be the rephrasing model (138) of FIG. 1. The rephrasing model (400) generates a number of modified inputs (402). In the example, modified input A (404) is "before Beatrice, will Adam be 60?" Modified input N (406) is "will Adam hit 60 before Beatrice?" The modified inputs (400) may include many more examples.

Next, the modified inputs (402) are provided to the test model (408), which may be the test model (140) of FIG. 1. The test model (408) produces a number of test outputs (410), one for each of the modified inputs (402).

Note that the modified inputs (402) may include the original input (i.e., the user input (304)). Thus, the test outputs (410) include an original test output (412), which is the test output of the machine learning model under test when the user input (304) is provided to the machine learning model. The original test output (412) is "yes," which is the correct answer. However, the modified test output A (414) (corresponding to the modified input A (404)) is "no," which is the incorrect answer. In turn, the modified test output N (416) is "yes," which is the correct answer. Many more test outputs may be present.

The test outputs (410) are provided to a similarity controller (418), which may be the similarity controller (142) of FIG. 1. The similarity controller (418) generates a number of similarity scores (420) by comparing pairs of the test outputs (410), as described with respect to FIG. 2. The similarity scores (420) include similarity score A (422), which in this example is the similarity score that is generated when the original test output (412) is compared to the modified test output A (414). The similarity scores (420) also include similarity score N (424), which in this example is the similarity score that is generated when the modified test output A (414) is compared to the modified test output N (416). However, many more similarity scores may be generated, one per pair of the test outputs (410), such as for example a comparison between the original test output (412) and the modified test output N (416).

The similarity scores (420) are provided to a confidence controller (426), which may be the confidence controller (144) of FIG. 1. The confidence controller (426) generates a model confidence (428), as described with respect to FIG. 2. The confidence controller (426) then compares the model confidence (428) to a confidence threshold (430).

If the model confidence (428) satisfies the confidence threshold (430), then it is determined that the test model (408) is relatively insensitive to semantic perturbations in input. Thus, a determination or assumption is made that the test model (408) will reliably generate an answer to the user input (304) that is likely to be correct. Accordingly, the user input (304) is routed to the test model (408).

However, to maximize the probability that the test model (408) returns a correct answer, the confidence controller (426) calls a vote controller (432) to generate a voted output (434). The vote controller (432) accepts the similarity scores (420) and the test outputs (410) as input, and performs a voting operation as described above with respect to FIG. 2. In this case, the answer "yes" is voted to be the correct answer. Thus, the voted output (434) is returned as the presentation output (436), which in turn is transmitted to the user device (302).

Note that the user input (304) is still routed to the test model (408) when the confidence controller (426) calls the vote controller (432). The reason is that the user input (304) is still provided to the test model (408), which generates the original test output (412) as one of the test outputs (410). However, in addition, the test outputs (410) that are remaining are used to help ensure that the original test output (412) is actually the correct answer to the user input (304), as described above. Thus, whether the original test output (412) is returned directly to the user device (302) as the presentation output (436), or whether the voted output (434) is returned to the user device (302) as the presentation output (436), in either case the user input (304) was routed to the test model (408) as a result of the model confidence (428) satisfying the confidence threshold (430).

On the other hand, if the confidence controller (426) determines that the model confidence (428) does not satisfies the confidence threshold (430), then the user input (304) is routed to a facilitator device (438). The facilitator device (438) displays the user input (304) to a human help desk operator. The help desk operator uses a user input device of the facilitator device (438) to input an answer to the user input (304). In this case, the human help desk operator checks and verifies that Adam is, indeed, older than Beatrice. Thus, the help desk operator responds "yes" to the user input (304). The facilitator-supplied answer is then transmitted to the user device (302) as the presentation output (436).

Thus, the example of FIG. 4 shows that the one or more embodiments may be used to measure the confidence that a particular input provided to a particular machine learning model will generate a consistent output for reporting to the user device (302). In this manner, the automated system for answering user questions will generate improved answers, or at least will be less likely to generate inappropriate or incorrect answers to user questions.

It is worth repeating that the one or more embodiments may be applied to applications other than questions and answers which may be generated by language models. The one or more embodiments also may be applied to routing the user input for language models programmed to perform text summarization, story generation, and other language model applications. Thus, for example, the text summary or the story generated by a language model may be modified multiple times and then re-submitted as input to the language model to generate test outputs of similar types. The similarity controller then generates similarity scores, as described above. The confidence controller may then generate a model confidence, as described above, and route the user input or generate a voted output, as described above. Accordingly, the one or more embodiments are not limited to question-answer applications in language models.

Figure 5A:
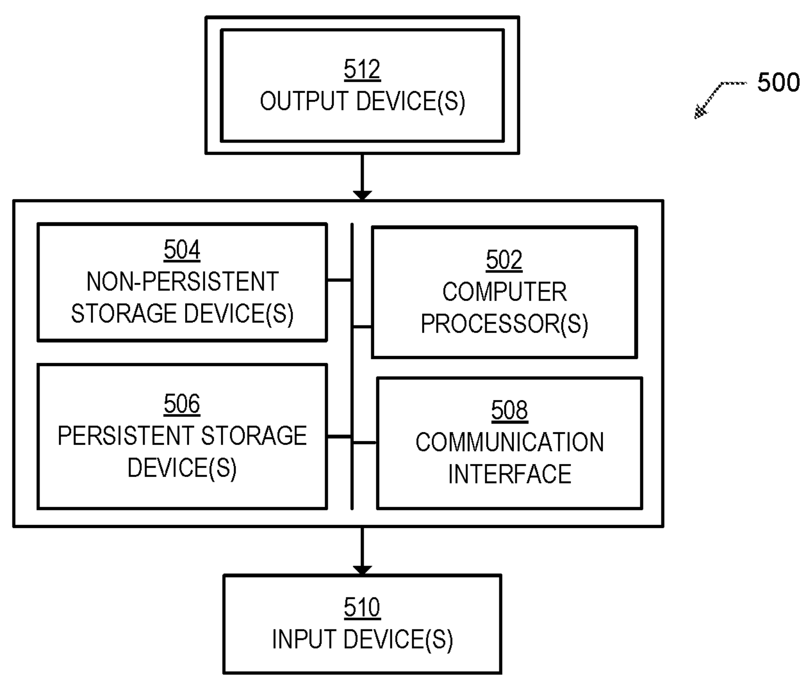
FIG. 5A and FIG. 5B show a computing system and network environment, in accordance with one or more embodiments.

Embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 5A, the computing system (500) may include one or more computer processors (502), non-persistent storage device(s) (504), persistent storage device(s) (506), a communication interface (508) (e.g., Bluetooth interface, infrared interface, network interface, optical interface, etc.), and numerous other elements and functionalities that implement the features and elements of the disclosure. The computer processor(s) (502) may be an integrated circuit for processing instructions. The computer processor(s) may be one or more cores or micro-cores of a processor. The computer processor(s) (502) includes one or more processors. The one or more processors may include a central processing unit (CPU), a graphics processing unit (GPU), a tensor processing units (TPU), combinations thereof, etc.

The input devices (510) may include a touchscreen, keyboard, mouse, microphone, touchpad, electronic pen, or any other type of input device. The input devices (510) may receive inputs from a user that are responsive to data and messages presented by the output devices (512). The inputs may include text input, audio input, video input, etc., which may be processed and transmitted by the computing system (500) in accordance with the disclosure. The communication interface (508) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the output devices (512) may include a display device, a printer, external storage, or any other output device. One or more of the output devices may be the same or different from the input device(s). The input and output device(s) may be locally or remotely connected to the computer processor(s) (502). Many different types of computing systems exist, and the aforementioned input and output device(s) may take other forms. The output devices (512) may display data and messages that are transmitted and received by the computing system (500). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments, which may include transmitting, receiving, presenting, and displaying data and messages described in the other figures of the disclosure.

Figure 5B:
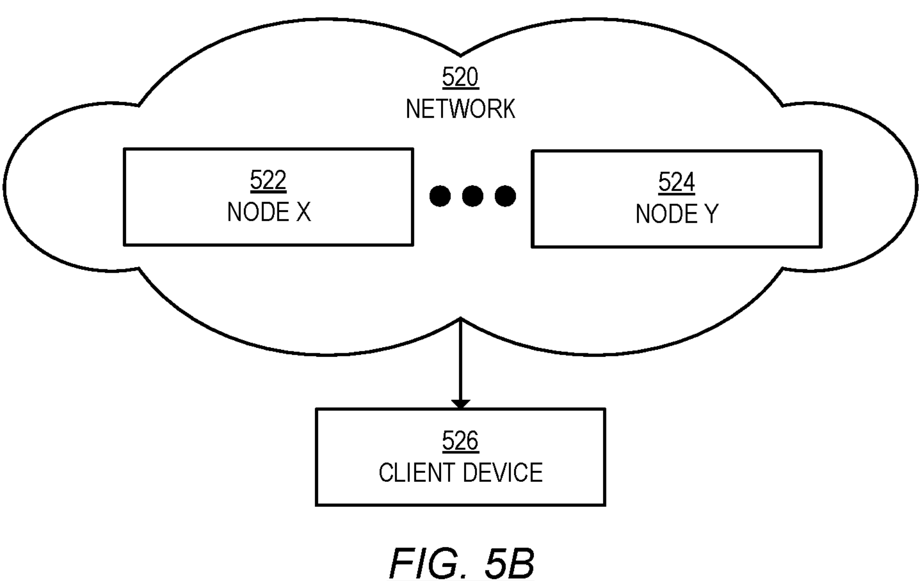

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (500) may be located at a remote location and connected to the other elements over a network.

The nodes (e.g., node X (522), node Y (524)) in the network (520) may be configured to provide services for a client device (526), including receiving requests and transmitting responses to the client device (526). For example, the nodes may be part of a cloud computing system. The client device (526) may be a computing system, such as the computing system shown in FIG. 5A. Further, the client device (526) may include and/or perform all or a portion of one or more embodiments.

The computing system of FIG. 5A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a GUI that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be temporary, permanent, or semi-permanent communication channel between two entities.

The various descriptions of the figures may be combined and may include or be included within the features described in the other figures of the application. The various elements, systems, components, and steps shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, the word "or" is an "inclusive or" and, as such includes "and." Further, items joined by an or may include any combination of the items with any number of each item unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:

intercepting a user input from a user device to a test language model, the user input comprising an electronic communication in a natural language, wherein the test language model, when executed, is programmed to output a first response to the user input;

generating, by a rephrasing model comprising a first natural language machine learning model, a plurality of modified inputs, wherein the rephrasing model receives, as input, the user input and generates, as output, the plurality of modified inputs;

executing the test language model on the user input and plurality of modified inputs to generate a plurality of test outputs comprising an original test output and a plurality of modified test outputs;

generating a plurality of similarity scores by performing a plurality of similarity comparisons among the plurality of test outputs, wherein each of the plurality of similarity scores represent a quantified measurement of a semantic similarity between two of the plurality of test outputs;

determining a model confidence by combining the plurality of similarity scores, wherein:

the model confidence comprises a number that represents a second quantified measurement of stability of the plurality of test outputs of the test language model when provided with the user input, and the second quantified measurement of stability comprises the plurality of test outputs being within a quantifiable semantic distance of each other;

comparing the model confidence to a confidence threshold and determining that the model confidence fails to satisfy the confidence threshold; and routing, responsive to the model confidence failing to satisfy the confidence threshold, the user input, wherein routing comprises:

determining a knowledge domain of the user input, routing the user input to a domain model trained on training data in the knowledge domain, executing the domain model on the user input to generate a second response, and transmitting the second response to the user device instead of the first response.

2. The method of claim 1, further comprising:

generating a voted output from the plurality of test outputs, wherein the voted output is selected from the plurality of test outputs using the plurality of similarity scores.

3. The method of claim 1, wherein the user input is a string of text using natural language.

4. The method of claim 1, further comprising:

rephrasing, prior to generating the plurality of modified inputs, the user input.

5. The method of claim 1, wherein the rephrasing model comprises a generative pre-training transformer (GPT) model.

6. A system comprising:

a processor;

a memory; and an application stored on the memory that, when executed by the processor performs a computer-implemented method comprising:

intercepting a user input from a user device to a test language model, the user input comprising an electronic communication in a natural language, wherein the test language model, when executed, is programmed to output a first response to the user input;

generating, by a rephrasing model comprising a first natural language machine learning model, a plurality of modified inputs, wherein the rephrasing model receives, as input, the user input and generates, as output, the plurality of modified inputs;

executing the test language model on the user input and plurality of modified inputs to generate a plurality of test outputs comprising an original test output and a plurality of modified test outputs;

generating a plurality of similarity scores by performing a plurality of similarity comparisons among the plurality of test outputs, wherein each of the plurality of similarity scores represent a quantified measurement of a semantic similarity between two of the plurality of test outputs;

determining a model confidence by combining the plurality of similarity scores, wherein:

the model confidence comprises a number that represents a second quantified measurement of stability of the plurality of test outputs of the test language model when provided with the user input, and the second quantified measurement of stability comprises the plurality of test outputs being within a quantifiable semantic distance of each other;

comparing the model confidence to a confidence threshold and determining that the model confidence fails to satisfy the confidence threshold; and routing, responsive to the model confidence failing to satisfy the confidence threshold, the user input, wherein routing comprises:

determining a knowledge domain of the user input, routing the user input to a domain model trained on training data in the knowledge domain, executing the domain model on the user input to generate a second response, and transmitting the second response to the user device instead of the first response.

7. The system of claim 6, wherein the computer-implemented method further comprises:

rephrasing, prior to generating the plurality of modified inputs, the user input.

8. The system of claim 6, wherein the rephrasing model comprises a generative pre-training transformer (GPT) model.

9. A non-transitory computer readable storage medium storing computer readable program code which, when executed by a processor, performs a computer-implemented algorithm comprising:

intercepting a user input from a user device to a test language model, the user input comprising an electronic communication in a natural language, wherein the test language model, when executed, is programmed to output a first response to the user input;

generating, by a rephrasing model comprising a first natural language machine learning model, a plurality of modified inputs, wherein the rephrasing model receives, as input, the user input and generates, as output, the plurality of modified inputs;

executing the test language model on the user input and plurality of modified inputs to generate a plurality of test outputs comprising an original test output and a plurality of modified test outputs;

generating a plurality of similarity scores by performing a plurality of similarity comparisons among the plurality of test outputs, wherein each of the plurality of similarity scores represent a quantified measurement of a semantic similarity between two of the plurality of test outputs;

determining a model confidence by combining the plurality of similarity scores, wherein:

the model confidence comprises a number that represents a second quantified measurement of stability of the plurality of test outputs of the test language model when provided with the user input, and the second quantified measurement of stability comprises the plurality of test outputs being within a quantifiable semantic distance of each other;

comparing the model confidence to a confidence threshold and determining that the model confidence fails to satisfy the confidence threshold; and routing, responsive to the model confidence failing to satisfy the confidence threshold, the user input, wherein routing comprises:

determining a knowledge domain of the user input, routing the user input to a domain model trained on training data in the knowledge domain, executing the domain model on the user input to generate a second response, and transmitting the second response to the user device instead of the first response.

10. The non-transitory computer readable storage medium of claim 9, wherein the computer-implemented algorithm further comprises:

generating a voted output from the plurality of test outputs, wherein the voted output is selected from the plurality of test outputs using the plurality of similarity scores.

* * * * *